United States Patent
Kommidi et al.

(10) Patent No.: US 8,174,969 B1
(45) Date of Patent: May 8, 2012

(54) CONGESTION MANAGEMENT FOR A PACKET SWITCH

(75) Inventors: Raghunath Reddy Kommidi, Hyderbad (IN); David Alan Brown, Carp, CA (US)

(73) Assignee: Integrated Device Technology, inc, San Jose, CA (US)

( * ) Notice: Subject to any disclaimer, the term of this patent is extended or adjusted under 35 U.S.C. 154(b) by 351 days.

(21) Appl. No.: 12/625,491

(22) Filed: Nov. 24, 2009

(51) Int. Cl.
 *H04L 12/26* (2006.01)
(52) U.S. Cl. ...................................................... 370/229
(58) Field of Classification Search .......... 370/229–235, 370/464, 465; 710/29, 36–52, 58–61
See application file for complete search history.

(56) References Cited

U.S. PATENT DOCUMENTS

| | | | |
|---|---|---|---|
| 7,424,566 B2 * | 9/2008 | Manula et al. ................ | 710/310 |
| 7,852,757 B1 * | 12/2010 | Puranik ......................... | 370/229 |
| 2006/0123179 A1 * | 6/2006 | Wong et al. ................... | 710/307 |
| 2009/0254692 A1 * | 10/2009 | Feehrer ......................... | 710/315 |
| 2010/0312928 A1 * | 12/2010 | Brownell et al. .............. | 710/57 |

\* cited by examiner

*Primary Examiner* — Dmitry H Levitan
(74) *Attorney, Agent, or Firm* — Kenneth Glass; Stanley J. Pawlik; Glass & Associates

(57) ABSTRACT

A packet switch includes a flow control circuit for preventing a downstream ingress port of the packet switch from providing a non-posted packet to an upstream egress port of the packet switch when a downstream egress port of the packet switch is congested. As a result, congestion is reduced in the downstream egress port. Additionally, congestion is reduced in an upstream ingress port of the packet switch that receives completion packets in response to non-posted packets output from the upstream egress port and provides the completion packets to the downstream egress port. Because congestion is reduced in the upstream ingress port, latency is reduced for a completion packet received at the upstream ingress port and provided to another downstream egress port of the packet switch in response to a non-posted packet provided from another downstream ingress port to the upstream egress port and output from the packet switch.

25 Claims, 4 Drawing Sheets

CONGESTION MANAGEMENT FOR A PACKET SWITCH

BACKGROUND

A computing system typically includes a computing processor, peripheral devices, and a peripheral interconnect for facilitating communication between the computing processor and the peripheral devices. In many contemporary computing systems, the peripheral interconnect has a packet based switching architecture. One such type of peripheral interconnect that conforms to a PCI Express (PCIe) standard is sometimes referred to as a PCIe interconnect. A PCIe interconnect includes one or more serial communication channels, each of which is capable of transmitting packets in both directions of the serial communication channel. Moreover, the serial communication channels of the PCIe interconnect may be combined to create a parallel interface of independently controlled serial communication channels, each of which is often referred to as a lane.

In some contemporary computing systems, a PCIe interconnect includes a root complex and a fanout switch connected to the root complex. The root complex is connected to a computing processor and the fanout switch is connected to endpoints. In operation, an endpoint transmits packets to a downstream ingress queue of the fanout switch and the downstream ingress queue forwards the packets to an upstream egress queue of the fanout switch. Additionally, the fanout switch transmits packets from the upstream egress queue to the root complex and the root complex transmits the packets to the computer processor for processing.

In these types of computing systems, a packet may be a posted packet or a non-posted packet. If a packet received by the computing processor from the root complex is a posted packet, the computing processor terminates the packet. Otherwise, if a packet received by the computing processor from the root complex is a non-posted packet, the computing processor terminates the non-posted packet and transmits a corresponding completion packet to an upstream ingress queue of the fanout switch. The upstream ingress queue provides the completion packet to a downstream egress queue of the fanout switch and the downstream egress queue provides the completion packet to the endpoint that initially transmitted the non-posted packet to the fanout switch.

In one type of PCIe interconnect, a downstream bandwidth from the root complex to the fanout switch is higher than an upstream bandwidth from an endpoint to the fanout switch. In this type of PCIe interconnect, the root complex may transmit completion packets to the upstream ingress port of the fanout switch at a data rate that is faster than a data rate at which the endpoint transmits corresponding non-posted packets to the downstream ingress port of the fanout switch. Moreover, if the endpoint transmits a stream of non-posted packets upstream to the fanout switch at an upstream data rate, the root complex may transmit a stream of corresponding completion packets downstream to the fanout switch at an initial downstream data rate that is higher than the upstream data rate.

If the stream of non-posted packets is sufficiently large, the downstream egress queue of the fanout switch fills to capacity causing the upstream ingress queue of the fanout switch to also fill to capacity. In this way, the upstream ingress queue and the downstream egress queue become congested. Because the upstream ingress queue is congested, the initial downstream data rate at which the root complex transmits the stream of completion packets to the fanout switch decreases and the downstream bandwidth from the root complex to the fanout switch is underutilized. Moreover, the initial data rate tends to decrease to the upstream data rate at which the endpoint transmits the stream of non-posted data packets to the fanout switch.

Because of the congestion at the upstream ingress port of the fanout switch, a completion packet may be delayed from reaching a second endpoint that has transmitted a corresponding non-posted packet to the root complex through the fanout switch. Additionally, the second endpoint competes for access to the upstream egress queue of the fanout switch, which may become congested because of non-posted packets of the stream of non-posted packets being transmitted to the root complex through the fanout switch by the first endpoint. If the upstream egress port of the fanout switch becomes congested, the non-posted packet transmitted by the second endpoint may be delayed in entering the upstream egress queue causing the corresponding completion packet to be further delayed in reaching the second endpoint.

In light of the above, a need exists for reducing congestion in a packet switch. A further need exists for reducing congestion in a packet switch when a stream of non-posted packets and a corresponding stream of completion packets are transmitted through the packet switch.

SUMMARY

In various embodiments, a packet switch includes a first downstream ingress port and a second downstream ingress port, each of which provides packets to an upstream egress port of the packet switch. In turn, the upstream egress port outputs the packets from the packet switch. Moreover, the packets output from the packet switch may include posted packets and non-posted packets. The packet switch also includes an upstream ingress port for receiving completion packets in response to the non-posted packets output from the upstream egress port. The upstream ingress port selectively routes the completion packets to a first downstream egress port and a second downstream egress port of the packet switch based on destination identifiers in the completion packets. Additionally, the packet switch includes a flow control circuit for preventing the first downstream ingress port from providing a non-posted packet to the upstream egress port when the first downstream egress port of the packet switch is congested. As a result, congestion is reduced in the first downstream egress port which reduces congestion in the upstream ingress port. Because congestion is reduced in the upstream ingress port, latency is reduced for a completion packet received at the upstream ingress port and provided to the second downstream egress port of the packet switch in response to a non-posted packet provided from the second downstream ingress port to the upstream egress port and output from the packet switch.

In some embodiments, an input bandwidth of the upstream ingress port is higher than an output bandwidth of the first downstream egress port. In these embodiments, the reduced congestion in the upstream ingress port avoids underutilization of the input bandwidth of the upstream ingress port. In particular, the reduced congestion in the upstream ingress port avoids underutilization of the input bandwidth of the upstream ingress port for a sufficiently large stream of completion packets received at the upstream ingress port in response to a corresponding stream of non-posted packets output from the packet switch at the upstream egress port. Moreover, the reduced congestion in the upstream ingress port reduces congestion in the upstream egress port, which further reduces latency for a completion packet received at the upstream ingress port and provided to the second downstream egress port in response to a non-posted packet provided from the second downstream ingress port to the upstream egress port and output from the packet switch.

A packet switch, in accordance with one embodiment, includes an upstream egress port, an upstream ingress port, a first downstream ingress port, a first downstream egress port, a second downstream ingress port, a second downstream egress port, and a flow control circuit. The first downstream ingress port and the second downstream ingress port are coupled to the upstream egress port. The first downstream egress port and the second downstream egress port are coupled to the upstream ingress port. Additionally, the flow control circuit is coupled to the first downstream ingress port and the first downstream egress port. The first downstream ingress port is configured to provide non-posted packets to the upstream egress port and the upstream egress port is configured to output the non-posted packets from the packet switch. The upstream ingress port is configured to receive completion packets in response to the non-posted packets output from the packet switch and provide the completion packets to the first downstream egress port. The first downstream egress port is configured to store the completion packets and output the completion packets from the packet switch. The second downstream ingress port is configured to provide packets to the upstream egress port, and the second downstream egress port is configured to receive packets from the downstream ingress port. The flow control circuit is configured to determine when the first downstream egress port is congested and prevent the first downstream ingress port from providing a non-posted packet to the upstream egress port when the first downstream egress port is congested.

A peripheral component interconnect, in accordance with one embodiment, includes a root complex for communicating with a computing processor. Additionally, the peripheral component interconnect includes a packet switch coupled to the root complex. The packet switch includes an upstream egress port configured to provide packets to the root complex. The packet switch further includes a first downstream ingress port coupled to the upstream egress port and configured to receive packets from a first endpoint and provide packets to the upstream egress port. Additionally, the packet switch includes a second downstream ingress port coupled to the upstream egress port and configured to receive packets from a second endpoint and provide packets to the upstream egress port. The packet switch also includes a first downstream egress port coupled to the first endpoint and a second downstream egress port coupled to the second endpoint. Additionally, the packet switch includes an upstream ingress port coupled to the first downstream egress port and the second downstream egress port and configured to receive packets including destination identifiers from the root complex. The packet switch is further configured to selectively route the packets received from the root complex to the first downstream egress port or the second downstream egress port based on the destination identifiers. The packet switch also includes a flow control circuit configured to determine when the first downstream egress port is congested. The flow control circuit is further configured to prevent the first downstream ingress port from providing a non-posted packet to the upstream egress port when the first downstream egress port is congested and allow the first downstream ingress port to provide a posted packet to the upstream egress port when the first downstream egress port is congested.

A method of reducing congestion in a packet switch, in accordance with one embodiment, includes receiving non-posted packets at a first downstream ingress port of a packet switch and determining whether a first downstream egress port of the packet switch is congested. The method further includes providing the non-posted packets to an upstream egress port of the packet switch while preventing the first downstream ingress port from providing a non-posted packet to the upstream egress port when the first downstream egress port is congested. Additionally, the method includes outputting the non-posted packets from the packet switch at the upstream egress port and receiving completion packets at an upstream ingress port of the packet switch in response to the non-posted packets output from the packet switch. The method also includes providing the completion packets to the first downstream egress port, storing the completion packets in the first downstream egress port, and outputting the completion packets from the packet switch at the first downstream egress port.

BRIEF DESCRIPTION OF THE DRAWINGS

The accompanying drawings are included to provide a further understanding of the invention, and are incorporated in and constitute a part of this specification. The drawings illustrate embodiments of the invention, and together with the description, serve to explain the principles of the invention.

DETAILED DESCRIPTION

In various embodiments, a packet switch includes a flow control circuit for preventing a first downstream ingress port of the packet switch from providing a non-posted packet to an upstream egress port of the packet switch when a first downstream egress port of the packet switch is congested. As a result, congestion is reduced in the downstream egress port. Additionally, congestion is reduced in an upstream ingress port of the packet switch that receives completion packets in response to non-posted packets output from the upstream egress port and provides the completion packets to the first downstream egress port. Because congestion is reduced in the upstream ingress port, latency is reduced for a completion packet received at the upstream ingress port and provided to a second downstream egress port of the packet switch in response to a non-posted packet provided from a second downstream ingress port to the upstream egress port and output from the packet switch. Additionally, underutilization of an input bandwidth of the upstream ingress port is avoided because of the reduced congestion of the upstream ingress port.

Figure 1:
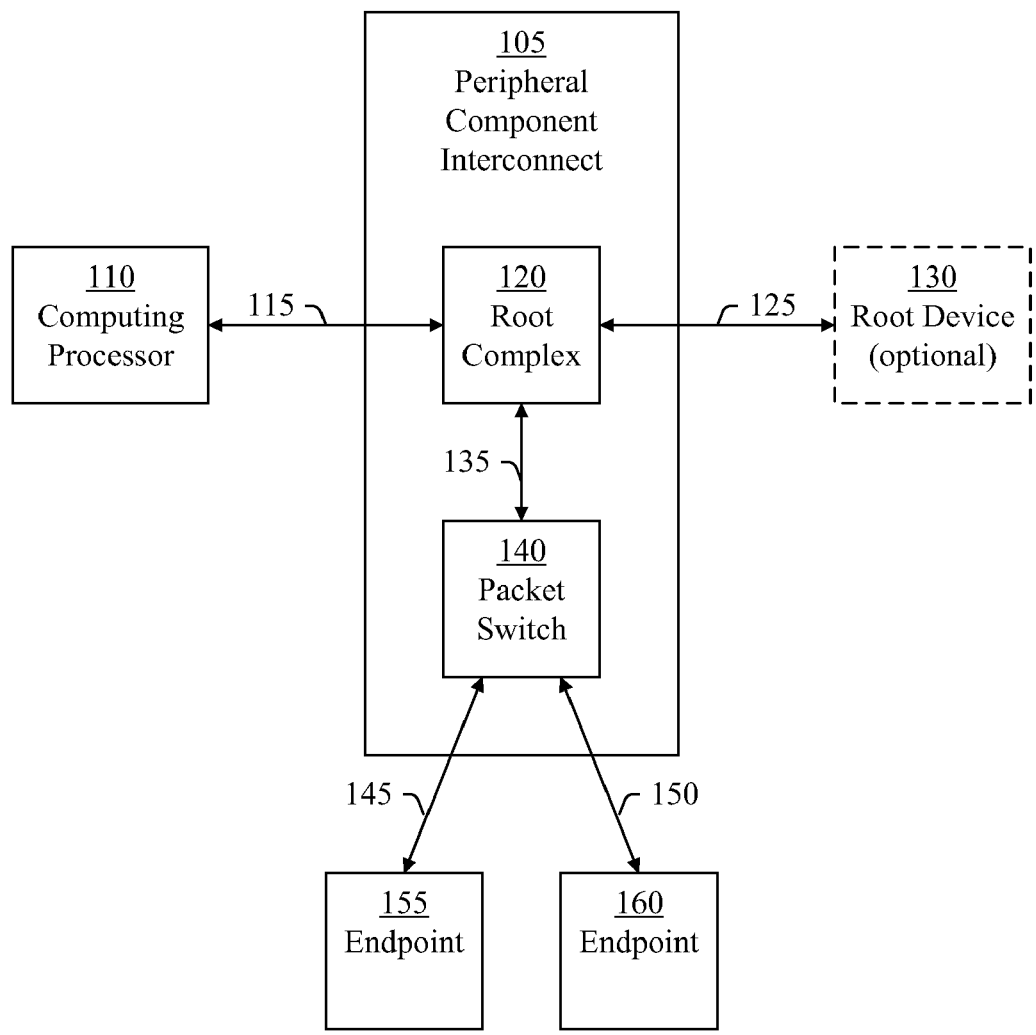
FIG. 1 is a block diagram of a computing system, in accordance with an embodiment of the present invention.

FIG. 1 illustrates a computing system 100, in accordance with one embodiment of the present invention. The computing system 100 includes a peripheral component interconnect 105, a computing processor 110, an endpoint 155, and an endpoint 160. The computing processor 110 is coupled to the peripheral component interconnect 105 through a communication link 115. For example, the computing processor 110 may be a central processing unit (CPU) and the communication link 115 may be a computer bus. In some embodiments, the communication link 115 is a serial data link for facilitating packet based communications between the computing processor 110 and the peripheral component interconnect 105.

Each of the endpoints 155 and 160 performs a peripheral function of the computing system 100, such as an input or output (I/O) function. The endpoint 155 is coupled to the peripheral component interconnect 105 through a communication link 145 including one or more data links. The endpoint 160 is coupled to the peripheral component interconnect 105 through a communication link 150 including one or more data links. For example, each of the communication links 145 and 150 may include serial data links. Moreover, the peripheral component interconnect 105 has a switch based architecture for facilitating packet based communications with the endpoints 155 and 160 through the respective communication links 145 and 150.

In various embodiments, the peripheral component interconnect 105 includes a root complex 120 and a packet switch 140. The root complex 120 is coupled to the computing processor 110 through the communication link 115 and to the packet switch 140 through a communication link 135. The communication link 135 includes one or more data links. For example, the communication link 135 may include one or more serial data links. The peripheral component interconnect 105 facilitates packet based communications between the root complex 120 and the packet switch 140. Additionally, the packet switch 140 is coupled to the endpoint 155 through the communication link 145 and to the endpoint 160 through the communication link 150. The root complex 120 functions to facilitate communications between the computing processor 110 and the root complex 120, which may include packet based communications in some embodiments. The packet switch 140 functions to facilitate packet based communications between the root complex 120 and the packet switch 140 and to facilitate packet based communications between the packet switch 140 and each of the endpoints 155 and 160.

In some embodiments, the computing system 100 includes an optional root device 130 coupled to the root complex 120 through a communication link 125. For example, the root device 130 may be a memory device or a memory system, and the communication link 125 may be a memory bus. In these embodiments, the root complex 120 facilitates communication between the computing processor 110 and the root device 130 through the communication link 115 and the communication link 125. In some embodiments, the root complex 120 facilitates packet based communications between the root device 130 and the root complex 120. Although one root device 130 is illustrated in FIG. 1, the computing system 100 may include more or fewer than one root device 130 coupled to the root complex 120 in other embodiments. Although two root endpoints 155 and 160 are illustrated in FIG. 1, the computing system 100 may have more than two root endpoints 155 or 160 coupled to the packet switch 140 in other embodiments.

In some embodiments, the peripheral component interconnect 105 is compliant with a Peripheral Component Interconnect Express™ (PCIe) standard maintained by the Peripheral Component Interconnect Special Interest Group (PCI-SIG). For example, the PCIe standard may be the PCIe base 2.0 specification or the PCIe base revision 2.1 specification. In some embodiments, the computing system 100 is implemented in an integrated circuit of an integrated circuit device which may include an integrated circuit package containing the integrated circuit. In other embodiments, the computing system 100 is implemented in more than one integrated circuit of an integrated circuit device which may include a multichip package containing the integrated circuits.

In some embodiments, the peripheral component interconnect 105 is implemented in an integrated circuit of an integrated circuit device which may include an integrated circuit package containing the integrated circuit. In other embodiments, the peripheral component interconnect 105 is implemented in more than one integrated circuit of an integrated circuit device which may include a multichip package containing the integrated circuits. In some embodiments, the packet switch 140 is implemented in an integrated circuit of an integrated circuit device which may include an integrated circuit package containing the integrated circuit. In other embodiments, the packet switch 140 is implemented in more than one integrated circuit of an integrated circuit device which may include a multichip package containing the integrated circuits.

Figure 2:
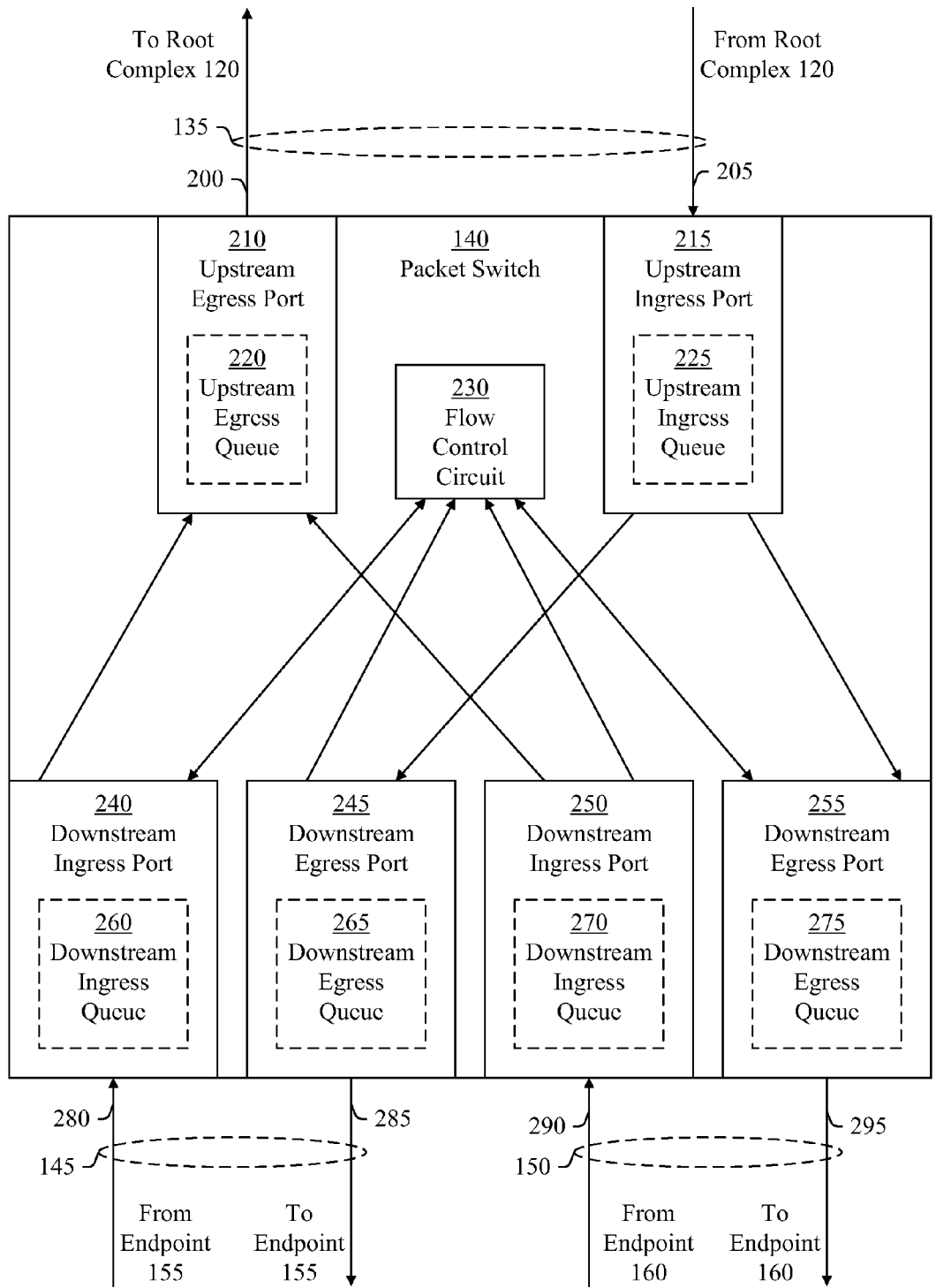
FIG. 2 is a block diagram of a packet switch, in accordance with an embodiment of the present invention.

FIG. 2 illustrates the packet switch 140, in accordance with an embodiment of the present invention. The packet switch 140 includes an upstream egress port 210, an upstream ingress port 215, a flow control circuit 230, a downstream ingress port 240, a downstream egress port 245, a downstream ingress port 250, and a downstream egress port 255. The downstream ingress port 240 and the downstream ingress port 250 are coupled to the upstream egress port 210. The downstream egress port 245 and the downstream egress port 255 are coupled to the upstream ingress port 215. Additionally, the downstream ingress port 240, the downstream egress port 245, the downstream ingress port 250, and the downstream egress port 255 are coupled to the flow control circuit 230. Although two downstream ingress ports 240 and 250 are illustrated in FIG. 2, the packet switch 140 may have more than two downstream ingress ports 240 or 250 in other embodiments. Moreover, the packet switch 140 may have more than two downstream egress ports 245 or 255 in other embodiments.

The flow control circuit 230 determines whether the downstream egress port 245 is congested and controls the flow of packets from the downstream ingress port 240 to the upstream egress port 210 if the downstream egress port 245 is congested, as is described more fully herein. In this way, the flow control circuit 230 reduces latencies for packets flowing from the downstream ingress port 250 to the upstream egress port 210 and for packets flowing from the upstream ingress port 215 to the downstream egress port 255, as is also described more fully herein.

As illustrated in FIG. 2, the communication link 135 includes an upstream data link 200 for facilitating packet based communications from the upstream egress port 210 to the root complex 120 and a downstream data link 205 for facilitating packet based communications from the root complex 120 to the upstream ingress port 215. The communication link 145 includes an upstream data link 280 for facilitating packet based communications from the endpoint 155 to the downstream ingress port 240 and a downstream data link 285 for facilitating packet based communications from the downstream egress port 245 to the endpoint 155. The communication link 150 includes an upstream data link 290 for facilitating packet based communications from the endpoint 160 to the downstream ingress port 250 and a downstream data link 295 for facilitating packet based communications from the downstream egress port 255 to the endpoint 160.

In various embodiments, the endpoint 155 initiates a transaction by providing a packet to the downstream ingress port 240 through the upstream data link 280. In this way, the endpoint 155 provides a request to the packet switch 140. In turn, the downstream ingress port 240 provides the packet to the upstream egress port 210. The upstream egress port 210 outputs the packet from the packet switch 140 to the root complex 120 through the upstream data link 200. In turn, root complex 120 provides the packet to the computing processor 110 or the root device 130 for processing.

Similarly, the endpoint 160 initiates a transaction by providing a packet to the downstream ingress port 250 through the upstream data link 290. In this way, the endpoint 160 provides a request to the packet switch 140. In turn, the downstream ingress port 250 provides the packet to the upstream egress port 210. The upstream egress port 210 outputs the packet from the packet switch 140 to the root complex 120 through the upstream data link 200. In turn, root complex 120 provides the packet to the computing processor 110 or the root device 130 for processing.

Additionally, the computing processor 110 initiates a transaction by providing a request to the root complex 120 through the communication link 115. The root complex 120 generates a packet based on the request received from the computing processor 110 and provides the packet to the upstream ingress port 215 through the downstream data link 205. In turn, the upstream ingress port 215 routes the packet received from the root complex 120 to downstream egress port 245 or the downstream egress port 255 based on the contents of the packet. In various embodiments, the computing processor 110 initiates a transaction by providing a signal or a packet to the root complex 120. In some embodiments, the computing processor 110 provides a packet to the root complex 120 and the root complex generates a packet by forwarding the packet received from the computing processor 110 to the upstream ingress port 215 of the packet switch 140.

In various embodiments, a packet received by the upstream ingress port 215 include a destination identifier for identifying a destination of the packet, and the upstream ingress port 215 routes the packet to the downstream egress port 245 or the downstream egress port 255, or both, based on the destination identifier. In this way, the upstream ingress port 215 provides the packet to the downstream egress port 245 or the downstream egress port 255. For example, the destination identifier may be a device identifier for identifying the endpoint 155 or the endpoint 160, or both. As another example, the destination identifier may be an address identifier for identifying an address, such as a memory address or an I/O address, in the endpoint 155 or the endpoint 160, or both. As still another example, the destination identifier may be a transaction identifier for identifying a transaction associated with the endpoint 155 or the endpoint 160, or both.

The downstream egress port 245 stores packets received from the upstream ingress port 215 and outputs the packets from the packet switch 140 to the endpoint 155 through the downstream data link 285. The downstream egress port 255 stores packets received from the upstream ingress port 215 and outputs the packets from the packet switch 140 to the endpoint 160 through the downstream data link 295. In various embodiments, the downstream egress port 245 may include a downstream egress queue 265 for storing packets, the downstream egress port 255 may include a downstream egress queue 275 for storing packets, the downstream ingress port 240 may include a downstream ingress queue 260 for storing packets, and the downstream ingress port 250 includes a downstream ingress queue 270 for storing packets. In further embodiments, the upstream egress port 210 may include an upstream egress queue 220 for storing packets and the upstream ingress port 215 may include an upstream ingress queue 225 for storing packets.

In various embodiments, the peripheral component interconnect 105 performs transactions between the computing processor 110 and the endpoints 155 and 160 by providing (e.g., forwarding) packets from the endpoints 155 and 160 to the computing processor 110 or by providing (e.g., routing) packets from the computing processor 110 to the endpoints 155 and 160, or both. In these embodiments, a transaction includes a request and may include one or more completions depending upon whether the request in the transaction is a posted request or a non-posted request. A posted transaction includes a posted request but does not include a completion. A non-posted transaction includes a non-posted request and includes one or more completions.

In operation, a requester initiates a posted transaction by generating a posted packet and providing the posted packet to the peripheral component interconnect 105. In this way, the requester initiates a posted request. In various embodiments, the requester of the posted transaction may be the computing processor 110, the root device 130, the endpoint 155, or the endpoint 160. The peripheral component interconnect 105 provides the posted packet to a completer which completes the posted transaction by terminating the posted packet. In various embodiments, the completer of the posted transaction may be the computing processor 110, the root device 130, the endpoint 155, or the endpoint 160.

A requester initiates a non-posted transaction by generating a non-posted packet and providing the non-posted packet to the peripheral component interconnect 105. In this way, the requester initiates a non-posted request. In various embodiments, the requester of a non-posted transaction may be the computing processor 110, the root device 130, the endpoint 155, or the endpoint 160. The peripheral component interconnect 105 provides the non-posted packet to a completer which terminates the non-posted packet. In various embodiments, the completer of the non-posted request may be the computing processor 110, the root device 130, the endpoint 155, or the endpoint 160. Additionally, the completer generates a completion corresponding to the non-posted request by generating one or more completion packets and providing each of the completion packets to the peripheral component interconnect 105. In turn, the peripheral component interconnect 105 provides each of the completion packets to the requester that generated the non-posted request. The requester terminates the non-posted transaction in response to the last completion packet in the non-posted transaction received from the peripheral component interconnect 105.

In some embodiments, the endpoint 155 is a requester but not a completer. In these embodiments, the packet switch 140 provides completion packets to the endpoint 155 but does not provide posted packets or non-posted packets to the endpoint 155. In further embodiments, each endpoint (e.g., the endpoint 155 and the endpoint 160) coupled to the packet switch 140 is a requester but not a completer. In these further embodiments, the packet switch 140 provides completion packets to the endpoints coupled to the packet switch 140 but does not provide posted packets or non-posted packets to the endpoints.

As may be envisioned from FIG. 2, the endpoint 155 may provide a stream of non-posted packets to the downstream ingress port 240. In turn, the downstream ingress port 240 provides the stream of non-posted packets to the upstream egress port 210 and the upstream egress port 210 outputs the stream of non-posted packets from the packet switch 140 to the root complex 120. The root complex 120 provides the stream of non-packets to an upstream device (e.g., the computing processor 110 or the root device 130). In response to the stream of non-posted packets provided to the upstream device from the root complex 120, the root complex 120 receives a corresponding stream of completion packets from the upstream device. In turn, the root complex 120 provides the stream of completion packets to the upstream ingress port 215 and the upstream ingress port 215 routes (e.g., provides) the stream of completion packets to the downstream egress port 245.

The flow control circuit 230 determines whether the downstream egress port 245 is congested by monitoring non-posted packets provided from the downstream ingress port 240 to the upstream egress port 210 and monitoring completion packets output from the downstream egress port 245. If the flow control circuit 230 determines the downstream egress port 245 is congested, the flow control circuit 230 prevents the downstream ingress port 240 from providing a non-posted packet to the upstream egress port 210 until the downstream egress port 245 becomes uncongested. In this way, the flow control circuit 230 prevents the upstream egress port 210 from receiving any non-posted packets from the downstream ingress port 240 when the downstream egress port 245 is congested.

Because the flow control circuit 230 prevents the downstream ingress port 240 from providing a non-posted packet to the upstream egress port 210 when the downstream egress port 245 is congested, an upstream device (e.g., the computing processor 110 or the root device 130) does not generate a completion packet corresponding to that non-posted packet when the downstream egress port 245 is congested. As a result, the number of completion packets stored in the downstream egress port 245 will eventually decrease and the downstream egress port 245 will become uncongested. Moreover, the flow control circuit 230 determines that the downstream egress port 245 is not congested (i.e., uncongested) and allows the downstream ingress port 240 to provide the non-posted packet to the upstream egress port 210.

Because the upstream ingress port 215 provides packets to the downstream egress port 245, the flow control circuit 230 also reduces congestion in the upstream ingress port 215 by reducing congestion in the downstream egress port 245. As a result, latencies are reduced for packets provided from the upstream ingress port 215 to the downstream egress port 255 (i.e., the second downstream egress port). For example, the latency for a completion packet received by the downstream egress port 255 in response to a corresponding non-posted packet provided from the downstream ingress port 250 to the upstream egress port 210 and output from the packet switch 140 is reduced when the upstream ingress port 215 is uncongested.

In some embodiments, the upstream ingress port 215 has an input bandwidth that is higher than an output bandwidth of the downstream egress port 245. In these embodiments, the upstream ingress port 215 may receive packets at a data rate that is higher than a data rate at which the downstream egress port 245 outputs packets from the packet switch 140. In these embodiments, the flow control circuit 230 prevents underutilization of the input bandwidth of the upstream ingress port 215 by reducing or avoiding congestion in the upstream ingress port 215.

Furthermore, the flow control circuit 230 reduces congestion in the upstream egress port 210 by reducing congestion in the downstream egress port 245. The flow control circuit 230 reduces congestion in the upstream egress port 210 by preventing the downstream ingress port 240 from providing a non-posted packet to the upstream egress port 210 when the downstream egress port 245 is congested. Additionally, the flow control circuit 230 reduces congestion in the upstream egress port 210 by avoiding underutilization of the downstream bandwidth of the upstream ingress port 215 that would cause an upstream device (e.g., the computing processor 110 or the root device 130) to become congested.

In some embodiments, the flow control circuit 230 maintains a flow control value for determining whether the downstream egress port 245 is congested. In these embodiments, the flow control circuit 230 initializes the flow control value, for example by setting the flow control value to zero. Further, the flow control circuit 230 increments the flow control value for each non-posted packet provided from the downstream ingress port 240 to the upstream egress port 210 after initialization of the flow control value and decrements the flow control circuit 230 for each completion packet output from the packet switch 140 by the downstream egress port 245 after initialization of the flow control value.

In various embodiments, the flow control circuit 230 increments the flow control value for a non-posted packet provided from the downstream ingress port 240 to the upstream egress port 210 to reflect the size of each completion packet expected to be received by the downstream egress port 245 in response to the upstream egress port 210 outputting the non-posted packet from the packet switch 140. Further in these embodiments, the flow control circuit 230 decrements the flow control value to reflect the size of each completion packet output from the downstream egress port 245 after initialization of the flow control value.

Additionally, the flow control circuit 230 compares the flow control value with a flow control threshold value. In various embodiments, the flow control threshold value corresponds to a capacity of the downstream egress port 245 for storing completion packets. In some embodiments, the flow control threshold value indicates a capacity of the downstream egress port 245 for storing completion packets. If the flow control value exceeds the flow control threshold value, the flow control circuit 230 determines that the downstream egress port 245 is congested. Otherwise, if the flow control value does not exceed the flow control threshold value, the flow control circuit 230 determines that the downstream egress port 245 is not congested (i.e., uncongested).

In various embodiments, the flow control threshold value is selected based on a capacity of the downstream egress port 245 for storing completion packets. In some embodiments, the flow control threshold value is a programmable value and the flow control circuit 230 programs the flow control threshold value, for example based on user input to the packet switch 140. In one embodiment, the flow control threshold value is a predetermined value indicating a number of completion packets capable of being simultaneously stored in the downstream egress port 245. For example, if the downstream egress port 245 has a capacity to store six completion packets, the flow control threshold value may have a predetermined value of five. In another embodiment, the flow control threshold value indicates a maximum number of completion packets capable of being simultaneously stored in the downstream egress port 245.

In some embodiments, the flow control threshold value indicates a maximum number of completion packets capable of being simultaneously stored in the downstream egress port 245 in addition to a number of completion packets selected based on an output bandwidth of the downstream egress port 245 and a latency for receiving a completion packet by the downstream egress port 245 in response to the downstream ingress port 240 providing a corresponding non-posted packet to the upstream egress port 210. In one embodiment, the flow control threshold value indicates the maximum number of completion packets capable of being simultaneously stored in the downstream egress port 245 in addition to a number of completion packets expected to be output from the downstream egress port 245 during the latency for receiving a completion packet by the downstream egress port 245 in response to the downstream ingress port 240 providing a corresponding non-posted packet to the upstream egress port 210 (i.e., a latency period).

For example, the downstream egress port 245 may have a capacity to store six completion packets, the output bandwidth of the downstream egress port 245 may be one completion packet per time period, and the latency for receiving a completion packet by the downstream egress port 245 in response to the downstream ingress port 240 providing a corresponding non-posted packet to the upstream egress port 210 may be three time periods. In this example, the flow control threshold value may be selected to be nine to account for the capacity of the downstream egress port 245 to store six completion packets and to account for the downstream egress port 245 to receive and output three completion packets during the latency period (i.e., three time periods). As a result, the downstream ingress port 240 may be filled to capacity during the latency period but avoid causing congestion in the upstream ingress port 215.

In various embodiments, the downstream ingress port 240 may receive packets in a sequential order and the flow control circuit 230 may cause the downstream ingress port 240 to provide the packets to the upstream egress port 210 in a non-sequential order. In this way, the flow control circuit 230 reorders the packets. For example, the downstream ingress port 240 may receive a non-posted packet followed by a posted packet and the flow control circuit 230 may prevent the downstream ingress port 240 from providing the non-posted packet to the upstream egress port 210 because the downstream egress port 245 is presently congested. Further in this example, the flow control circuit 230 allows the downstream ingress port 240 to provide the posted packet to the upstream egress port 210, determines that the downstream egress port 245 is no longer congested (i.e., uncongested), and allows the downstream ingress port 240 to provide the non-posted packet to the upstream egress port 210. In embodiments in which the packets are compliant with a PCIe 2.0 standard, the flow control circuit 230 reorders packets to avoid deadlock from occurring in the computing system 100 as is specified in the PCIe 2.0 standard.

In some embodiments, the downstream ingress port 250 and the downstream egress port 255 are coupled to the flow control circuit 230. In these embodiments, the flow control circuit 230 determines whether the downstream egress port 255 is congested and controls the flow of packets from the downstream ingress port 250 to the upstream egress port 210 if the downstream egress port 255 is congested in a similar manner as is described herein for the downstream ingress port 240 and the downstream egress port 245. In this way, the flow control circuit 230 reduces latencies for packets flowing from the downstream ingress port 240 to the upstream egress port 210 and for packets flowing from the upstream ingress port 215 to the downstream egress port 245 in a similar manner as is described herein for the downstream ingress port 250 and the downstream egress port 255.

For example, the flow control circuit 230 may maintain a flow control value for controlling the flow of packets from the downstream ingress port 240 to the upstream egress port 210 when the downstream egress port 245 is congested and another flow control value for controlling the flow of packets from the downstream ingress port 250 to the upstream egress port 210 when the downstream egress port 255 is congested. Moreover, the flow control circuit 230 may compare the flow control values with the same flow control value or with respective flow control threshold values that differ from each other.

In various embodiments, the downstream ingress port 240 provides data to the endpoint 155 indicating whether the downstream ingress port 240 is capable of accepting (e.g., storing or forwarding) a packet. Similarly, the downstream ingress port 250 provides data to the endpoint 160 indicating whether the downstream ingress port 250 is capable of accepting a packet. In some embodiments, the downstream ingress port 240 provides data to the endpoint 155 indicating a number of credits for each type of packet (e.g., posted, non-posted, and completion) the downstream ingress port 240 is capable of accepting. In turn, the endpoint 155 determines based on the credits whether the downstream ingress port 240 is capable of accepting a particular packet before the endpoint 155 provides (e.g., transmits) the particular packet to the downstream ingress port 240. Moreover, the endpoint 155 does not provide the particular packet to the downstream ingress port 240 if the downstream ingress port 240 is not capable of accepting the particular packet.

Similarly, the downstream ingress port 250 provides data to the endpoint 160 indicating a number of credits for each type of packet (e.g., posted, non-posted, and completion) the downstream ingress port 250 is capable of accepting. In turn, the endpoint 160 determines based on the credits whether the downstream ingress port 250 is capable of accepting a particular packet before the endpoint 160 provides (e.g., transmits) the particular packet to the downstream ingress port 250. Moreover, the endpoint 160 does not provide the particular packet to the downstream ingress port 250 if the downstream ingress port 250 is not capable of accepting the particular packet.

In some embodiments, the downstream ingress port 240 discards a packet received from the endpoint 155 when the downstream ingress port 240 is filled to capacity and is not capable of accepting the packet. Similarly, the downstream ingress port 250 discards a packet received from the endpoint 160 when the downstream ingress port 250 is filled to capacity and is not capable of accepting the packet. In further embodiments, the packet switch 140 generates an error message when the downstream ingress port 250 or 260 discards a packet and provides the error message to the root complex 120. In turn, the root complex 120 processes the error message, for example by providing the error message to the computing processor 110 or the root device 130.

Figure 3:
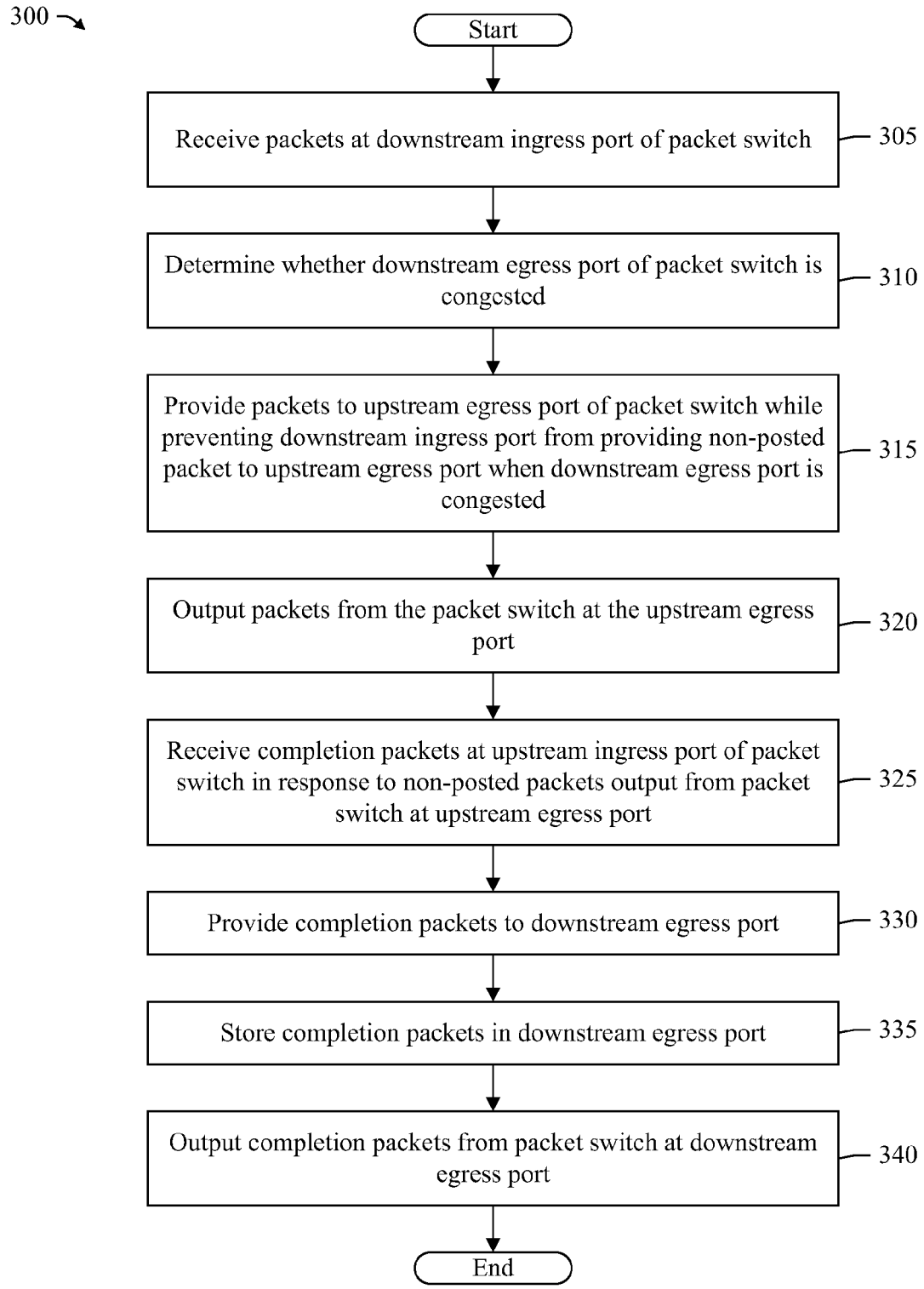
FIG. 3 is a flow chart of a method of reducing congestion in a packet switch, in accordance with an embodiment of the present invention.

FIG. 3 illustrates a method 300 of reducing congestion in a packet switch, in accordance with one embodiment of the present invention. In step 305, packets are received at a downstream ingress port of a packet switch. In various embodiments, packets are received at the downstream ingress port 240 of the packet switch 140. The packets received at the downstream ingress port 240 include non-posted packets and may include posted packets. In some embodiments, the downstream ingress port 240 stores the packets. For example, the downstream ingress port 240 may include a downstream ingress queue 260 and may store the packets in the downstream ingress queue 260 in the same order in which the downstream ingress port 240 received the packets. The method 300 then proceeds to step 310.

In step 310, it is determined whether a downstream egress port of the packet switch is congested. In various embodiments, the flow control circuit 230 determines whether the downstream egress port 245 is congested by monitoring non-posted packets output from the downstream ingress port 240 and completion packets output from the downstream egress port 245. In one embodiment, the flow control circuit 230 determines whether the downstream egress port 245 is congested based on a capacity of the downstream egress port 245 to store completion packets, a number of non-posted packets output from the downstream ingress port 240, and a number of completion packets output from the downstream egress port 245.

In some embodiments, the flow control circuit 230 determines whether the downstream egress port 245 is congested based on a capacity of the downstream egress port 245 to store completion packets, the sizes (e.g., number of bytes) of completion packets expected to be received by the upstream ingress port 215 for the non-posted packets, and the sizes (e.g., number of bytes) of completion packets output from the downstream egress port 245. In various embodiments, the flow control circuit 230 continually determines whether the downstream egress port 245 is congested. In some embodiments, the flow control circuit 230 periodically determines whether the downstream egress port 245 is congested, for example once during each clock cycle of a clock signal in the packet switch 140. The method 300 then proceeds to step 315.

In step 315, the packets are provided to an upstream egress port of the packet switch while preventing the downstream ingress port from providing a non-posted packet to the upstream egress port when the downstream egress port is congested. In various embodiments, the downstream ingress port 240 provides the packets to the upstream egress port 210 and the flow control circuit 230 prevents the downstream ingress port 240 from providing a non-posted packet to the upstream egress port 210 when the downstream egress port 245 is congested. The method 300 then proceeds to step 320.

In step 320, the packets are output from the packet switch at the upstream egress port. In various embodiments, the upstream egress port 210 outputs the packets from the packet switch 140. In some embodiments, the upstream egress port 210 stores the packets. For example, the upstream egress port 210 may include an upstream egress queue 220 and may store the packets in the upstream egress queue 220 in the same order in which the upstream egress port 210 received the packets. The method 300 then proceeds to step 325.

In step 325, completion packets are received at an upstream ingress port of the packet switch in response to non-posted packets output from the packet switch at the upstream egress port. In various embodiments, the upstream ingress port 215 receives completion packets in response to the non-posted packets output from the packet switch 140 at the upstream egress port 210. Moreover, each of the non-posted packets output from the packet switch 140 at the upstream egress port 210 corresponds to one or more completion packets received at the upstream ingress port 215. In some embodiments, the upstream ingress port 215 stores the completion packets. For example, the upstream ingress port 215 may include an upstream ingress queue 225 and may store the completion packets in the upstream ingress queue 225 in the same order in which the upstream ingress port 215 received the completion packets. The method 300 then proceeds to step 330.

In step 330, the completion packets are provided to a downstream egress port. In various embodiments, the upstream ingress port 215 provides the completion packets to the downstream egress port 245. For example, the upstream ingress port 215 may provide the completion packets to the downstream egress port 245 by routing the completion packets to the downstream egress port 245 based on destination identifiers in the completion packets. The method 300 then proceeds to step 335.

In step 335, the completion packets are stored in the downstream egress port. In various embodiments, the downstream egress port 245 stores the completion packet received from the upstream ingress port 215. For example, the downstream egress port 245 may include a downstream egress queue 265 and may store the completion packets in the downstream egress queue 265 in the same order in which the downstream egress port 245 received the completion packets. The method 300 then proceeds to step 340.

In step 340, the completion packets are output from the packet switch at the downstream egress port. In various embodiments, the downstream egress port 245 outputs the completion packets stored in the downstream egress port 245 from the packet switch 140. The method 300 then ends.

In various embodiments, the method 300 may include more or fewer than the steps 305-340 described above and illustrated in FIG. 3. In some embodiments, the steps 305-340 of the method 300 may be performed in a different order than the order described above and illustrated in FIG. 3. For example, the step 310 may be performed before the step 305. In some embodiments, some of the steps 305-340 of the method 300 may be performed in parallel or substantially simultaneously. For example, the step 310 may be performed in parallel or simultaneously with one or more of the steps 305 and 315-340. In various embodiments, one or more of the steps 305-340 may be performed more than once in the method 300. For example, the step 310 may be performed more than once in the method 300.

Figure 4:
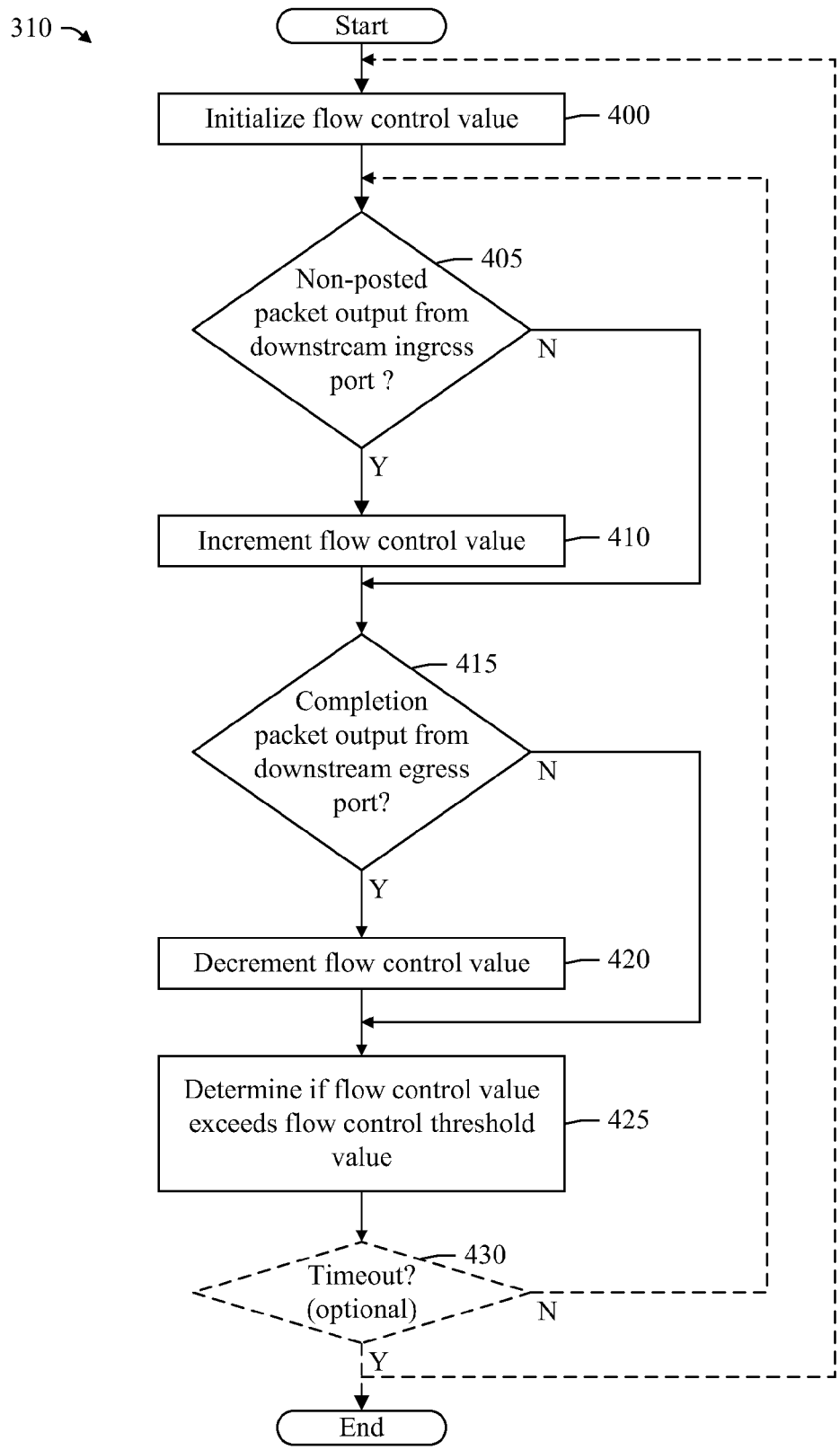
FIG. 4 is a flow chart for a portion of a method of reducing congestion in a packet switch, in accordance with an embodiment of the present invention.

FIG. 4 illustrates a portion of the method 300 of reducing congestion in a packet switch, in accordance with one embodiment of the present invention. The portion of the method 300 illustrated in FIG. 4 is an embodiment of the step 310 illustrated in FIG. 3. In step 400, a flow control value is initialized. In various embodiments, the flow control circuit 230 initializes a flow control value, for example by setting the flow control value to zero. The method 300 then proceeds to step 405.

In step 405, it is determined whether a non-posted packet is output from a downstream ingress port of the packet switch. In various embodiments, the flow control circuit 230 determines whether a non-posted packet is output from the downstream ingress port 240 by determining whether the downstream ingress port 240 provides a non-posted packet to the upstream egress port 210. In one embodiment, the downstream ingress port 240 provides a signal to the flow control circuit 230 indicating whether the downstream ingress port 240 provides a non-posted packet to the upstream egress port 210. In turn, the flow control circuit 230 determines based on the signal received from the downstream ingress port 240 whether the downstream ingress port 240 provided a non-posted packet to the upstream ingress port 210.

In another embodiment, the upstream egress port 210 provides a signal to the flow control circuit 230 indicating whether the upstream egress port 210 received a non-posted packet from the downstream ingress port 240. In turn, the flow control circuit 230 determines based on the signal received from the upstream egress port 210 whether the downstream ingress port 240 provided a non-posted packet to the upstream ingress port 210. The method 300 then proceeds to step 410.

In step 410, the flow control value is incremented. In various embodiments, the flow control circuit 230 increments the flow control value. In one embodiment, the flow control circuit 230 increments the flow control value by the number of completion packets expected to be received at the downstream egress port 245 for the non-posted packet provided from the downstream ingress port 240 to the upstream egress port 210. For example, the flow control circuit 230 may increment the flow control value by one for each completion packet expected to be received at the downstream egress port 245 for the non-posted packet provided from the downstream ingress port 240 to the upstream egress port 210. The method 300 then proceeds to step 415.

In step 415, it is determined whether a completion packet is output from the downstream egress port of the packet switch. In various embodiments, the flow control circuit 230 determines whether a completion packet is output from the downstream egress port 245. In one embodiment, the downstream egress port 245 provides a signal to the flow control circuit 230 indicating whether the downstream egress port 245 output a completion packet from the packet switch 140. For example, the downstream egress port 245 may provide a signal to the flow control circuit 230 indicating the downstream egress port 245 output a completion packet from the packet switch 140 to the endpoint 155. The method 300 then proceeds to step 420.

In step 420, the flow control circuit 230 decrements the flow control value. In one embodiment, the flow control circuit 230 decrements the flow control value for the completion packet output from the downstream egress port 245. In one embodiment, the flow control circuit 230 decrements the flow control value by a fixed value for the completion packet output from the downstream egress port 245. For example, the flow control circuit 230 may decrement the flow control value by a value of one for the completion packet output from the downstream egress port 245. In another embodiment, the flow control circuit 230 decrements the flow control value by the size of the completion packet output from the downstream egress port 245. For example, the flow control circuit 230 may decrement the flow control value by the number of bytes in the completion packet output from the downstream egress port 245. The method 300 then proceeds to step 425.

In step 425, it is determined whether the flow control value exceeds a flow control threshold value. In various embodiments, the flow control circuit 230 determines whether the flow control value exceeds a flow control threshold value indicating a capacity of the downstream egress port 245 to store completion packets. In one embodiment, the flow control circuit 230 determines whether the flow control value exceeds a flow control threshold value by comparing the flow control value with the flow control threshold value. If the flow control value exceeds the flow control threshold value, the flow control circuit 230 determines that the downstream egress port 245 is congested. Otherwise, if the flow control value does not exceed the flow control threshold value, the flow control circuit 230 determines that the downstream egress port 245 is not congested (i.e., uncongested). The method 300 then proceeds to step 430.

In optional step 430, it is determined whether a timeout has occurred. In various embodiments, the flow control circuit 230 determines whether a timeout has occurred. In one embodiment, the flow control circuit 230 maintains a time value and compares the time value with a time value threshold to determine whether a timeout has occurred. If the time value exceeds the time value threshold, the flow control circuit 230 determines that a timeout has occurred and the step 310 ends. In an alternative embodiment, the method 300 returns to step 400 if the flow control circuit 230 determines that a timeout has occurred. Otherwise, if the flow control circuit 230 determines that a timeout has not occurred, the method 300 returns to step 405. In various embodiments without step 430, the method 300 ends or returns to step 405 after step 425.

In some embodiments, the time value is incremented for each clock cycle of a clock signal in the packet switch 140 in which the upstream ingress port 215 does not receive a completion packet for a corresponding non-posted packet provided by the downstream ingress port 240 to the upstream egress port 210. For example, a non-posted packet provided from the downstream ingress port 240 to the upstream egress port 210 may include an identifier for identifying the non-posted packet. In this example, the corresponding completion packet expected to be received by the upstream ingress port 215 includes the same identifier. Moreover, the control flow circuit 230 sets the time value threshold to a number of clock cycles of the clock signal which is longer than an expected latency (i.e., a round trip latency) for receiving the completion packet at the downstream ingress port 215 in response to the downstream ingress port 240 providing the corresponding non-posted packet to the upstream egress port 210. In some embodiments, the time value is incremented for each clock cycle of a clock signal in the packet switch 140 in which the downstream egress port 245 does not receive a completion packet for a corresponding non-posted packet provided by the downstream ingress port 240 to the upstream egress port 210.

In various embodiments, the time value threshold is in a range from two to three times the expected latency for receiving the completion packet at the downstream ingress port 215 in response to the downstream ingress port 240 providing the corresponding non-posted packet to the upstream egress port 210. In some embodiments, the time value threshold is a programmable value and the flow control circuit 230 programs the time value threshold, for example based on user input received by the packet switch 140.

In various embodiments, the step 310 of the method 300 illustrated in FIG. 4 may include more or fewer than the steps 400-430 described above and illustrated in FIG. 4. In some embodiments, the steps 400-430 of the method 300 may be performed in a different order than the order described above and illustrated in FIG. 4. For example, the steps 415 and 420 may be performed before the steps 405 and 410. In some embodiments, some of the steps 400-415 of the method 300 may be performed in parallel or substantially simultaneously. For example, the steps 405 and 415 may be performed in parallel or substantially simultaneously. In various embodiments, one or more of the steps 400-430 may be performed more than once in the method 300. For example, each of the steps 405-430 may be performed more than one in the method 300.

Although the invention has been described with reference to particular embodiments thereof, it will be apparent to one of ordinary skill in the art that modifications to the described embodiment may be made without departing from the spirit of the invention. Accordingly, the scope of the invention will be defined by the attached claims not by the above detailed description.

What is claimed is:

1. An integrated circuit device comprising a packet switch, the packet switch comprising:
   an upstream egress port;
   a first downstream ingress port coupled to the upstream egress port and configured to provide a plurality of non-posted packets to the upstream egress port, the upstream egress port configured to output the plurality of non-posted packets from the packet switch;
   a first downstream egress port;
   an upstream ingress port coupled to the first downstream egress port and configured to receive a plurality of completion packets in response to the plurality of non-posted packets output from the packet switch and provide the plurality of completion packets to the first downstream egress port, the first downstream egress port configured to store the plurality of completion packets and output the plurality of completion packets from the packet switch;
   a second downstream ingress port coupled to the upstream egress port and configured to provide packets to the upstream egress port;

a second downstream egress port coupled to the upstream ingress port and configured to receive packets from the upstream ingress port; and a flow control circuit coupled to the first downstream ingress port and the first downstream egress port and configured to determine when the first downstream egress port is congested and prevent the first downstream ingress port from providing a non-posted packet to the upstream egress port when the first downstream egress port is congested.

2. The packet switch of claim 1, wherein the flow control circuit is further configured to initialize a flow control value, increment the flow control value for each non-posted packet provided from the first downstream ingress port to the upstream egress port, decrement the flow control value for each completion packet output from the first downstream egress port, and determine the first downstream egress port is congested if the flow control value exceeds a flow control threshold value.

3. The packet switch of claim 2, wherein the flow control threshold value corresponds to a number of completion packets capable of being simultaneously stored in the first downstream egress port.

4. The packet switch of claim 2, wherein the flow control threshold value is equal to a maximum number of completion packets capable of being simultaneously stored in the first downstream egress port.

5. The packet switch of claim 2, wherein the flow control threshold value is equal to a maximum number of completion packets capable of being simultaneously stored in the first downstream egress port in addition to a number of completion packets selected based on an expected latency for receiving a completion packet at the first downstream egress port in response to providing a corresponding non-posted packet from the first downstream ingress port to the upstream egress port.

6. The packet switch of claim 2, wherein the flow control threshold value is a programmable value and the flow control circuit is further configured to program the flow control threshold value.

7. The packet switch of claim 1, wherein the flow control circuit is further configured to allow the first downstream ingress port to provide a posted packet to the upstream egress port when the first downstream egress port is congested.

8. The packet switch of claim 7, wherein the first downstream ingress port is further configured to receive the non-posted packet before receiving the posted packet and to provide the posted packet to the upstream egress port before providing the non-posted packet to the upstream egress port when the first downstream egress port is congested.

9. The packet switch of claim 1, wherein an input bandwidth of the upstream ingress port is higher than an output bandwidth of the first downstream egress port and the flow control circuit is further configured to avoid underutilization of the input bandwidth of the upstream ingress port by preventing the first downstream ingress port from providing the non-posted packet to the upstream egress port when the first downstream egress port is congested.

10. The packet switch of claim 1, wherein the plurality of non-posted packets and the plurality of completion packets are compliant with a Peripheral Component Interconnect Express 2.0 standard.

11. A peripheral component interconnect comprising:
a root complex for communicating with a computing processor;
a packet switch coupled to the root complex, the packet switch comprising:

an upstream egress port configured to provide packets to the root complex;

a first downstream ingress port coupled to the upstream egress port and configured to receive packets from a first endpoint and provide packets to the upstream egress port;

a second downstream ingress port coupled to the upstream egress port and configured to receive packets from a second endpoint and provide packets to the upstream egress port;

a first downstream egress port coupled to the first endpoint;

a second downstream egress port coupled to the second endpoint;

an upstream ingress port coupled to the first downstream egress port and the second downstream egress port and configured to receive packets including destination identifiers from the root complex and selectively route the packets received from the root complex to the first downstream egress port or the second downstream egress port based on the destination identifiers; and a flow control circuit configured to determine when the first downstream egress port is congested, prevent the first downstream ingress port from providing a non-posted packet to the upstream egress port when the first downstream egress port is congested, and allow the first downstream ingress port to provide a posted packet to the upstream egress port when the first downstream egress port is congested.

12. The peripheral component interconnect of claim 11, wherein the flow control circuit is further configured to initialize a flow control value, increment the flow control value for each non-posted packet provided from the first downstream ingress port to the upstream egress port, decrement the flow control value for each completion packet output from the first downstream egress port, and determine the first downstream egress port is congested if the flow control value exceeds a flow control threshold value.

13. The peripheral component interconnect of claim 12, wherein the flow control threshold value corresponds to a number of completion packets capable of being simultaneously stored in the first downstream egress port.

14. The peripheral component interconnect of claim 12, wherein the flow control threshold value is equal to a maximum number of completion packets capable of being simultaneously stored in the first downstream egress port.

15. The peripheral component interconnect of claim 12, wherein the flow control threshold value is equal to a maximum number of completion packets capable of being simultaneously stored in the first downstream egress port in addition to a number of completion packets selected based on an expected latency for receiving a completion packet at the first downstream egress port in response to providing a corresponding non-posted packet from the first upstream ingress port to the upstream egress port.

16. The peripheral component interconnect of claim 12, wherein the flow control threshold value is a programmable value and the flow control circuit is further configured to program the flow control threshold value.

17. The peripheral component interconnect of claim 11, wherein the first downstream ingress port is further configured to receive the posted packet from the first endpoint, receive the non-posted packet from the first endpoint before receiving the posted packet from the first endpoint, and provide the posted packet to the upstream egress port before providing the non-posted packet to the upstream egress port when the first downstream egress port is congested.

18. The peripheral component interconnect of claim 11, wherein an input bandwidth of the upstream ingress port is higher than an output bandwidth of the first downstream egress port and the flow control circuit is further configured to avoid underutilization of the input bandwidth of the upstream ingress port by preventing the first downstream ingress port from providing the non-posted packet to the upstream egress port when the first downstream egress port is congested.

19. A method of reducing congestion in a packet switch, the method comprising:
- receiving a plurality of non-posted packets at a first downstream ingress port of a packet switch;
- determining whether a first downstream egress port of the packet switch is congested;
- providing the plurality of non-posted packets to an upstream egress port of the packet switch while preventing the first downstream ingress port from providing a non-posted packet to the upstream egress port when the first downstream egress port is congested;
- outputting the plurality of non-posted packets from the packet switch at the upstream egress port;
- receiving a plurality of completion packets at an upstream ingress port of the packet switch in response to the plurality of non-posted packets output from the packet switch;
- providing the plurality of completion packets to the first downstream egress port;
- storing the plurality of completion packets in the first downstream egress port; and
- outputting the plurality of completion packets from the packet switch at the first downstream egress port.

20. The method of claim 19, wherein determining whether the first downstream egress port of the packet switch is congested comprises:
- initializing a flow control value;
- incrementing the flow control value for each non-posted packet provided from the first downstream ingress port to the upstream egress port;
- decrementing the flow control value for each completion packet output from the first downstream egress port; and
- determining if the flow control value exceeds a flow control threshold value.

21. The method of claim 20, wherein the flow control threshold value corresponds to a number of completion packets capable of being simultaneously stored in the first downstream egress port.

22. The method of claim 20, wherein the flow control threshold value is equal to a maximum number of completion packets capable of being simultaneously stored in the first downstream egress port.

23. The method of claim 20, wherein the flow control threshold value is equal to a maximum number of completion packets capable of being simultaneously stored in the first downstream egress port in addition to a number of completion packets selected based on an expected latency for receiving a completion packet at the first downstream egress port in response to providing a corresponding non-posted packet from the first downstream ingress port to the upstream egress port.

24. The method of claim 20, wherein the flow control threshold value is a programmable value, the method further comprising programming the flow control threshold value.

25. The method of claim 19, further comprising allowing the first downstream ingress port to provide a posted packet to the upstream egress port when the downstream egress port is congested.

* * * * *